(12) United States Patent
Okumura

(10) Patent No.: US 7,944,163 B2
(45) Date of Patent: May 17, 2011

(54) SENSORLESS CONTROLLING APPARATUS OF BRUSHLESS MOTOR

(75) Inventor: Shigekazu Okumura, Sakurai (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 369 days.

(21) Appl. No.: 12/219,892

(22) Filed: Jul. 30, 2008

(65) Prior Publication Data

US 2009/0033262 A1 Feb. 5, 2009

(30) Foreign Application Priority Data

Aug. 2, 2007 (JP) ................. 2007-202204

(51) Int. Cl.
*H02P 6/00* (2006.01)
(52) U.S. Cl. ......... 318/400.32; 318/400.01; 318/400.02; 318/400.06; 318/636; 363/9; 363/10; 73/488; 73/514.02
(58) Field of Classification Search ............ 318/400.01, 318/400.02, 400.06, 400.32, 636; 363/9, 363/10; 73/488, 514.02; 702/96; 324/160–180; 361/236–244; 700/304
See application file for complete search history.

(56) References Cited

U.S. PATENT DOCUMENTS

| | | | | |
|---|---|---|---|---|
| 4,686,437 A | * | 8/1987 | Langley et al. | 318/400.01 |
| 5,426,354 A | * | 6/1995 | Bausch | 318/400.04 |
| 5,612,599 A | * | 3/1997 | Itami et al. | 318/400.27 |
| 5,936,378 A | * | 8/1999 | Iijima et al. | 318/807 |
| 6,157,150 A | * | 12/2000 | Konecny | 318/400.01 |
| 6,462,491 B1 | * | 10/2002 | Iijima et al. | 318/400.34 |
| 6,555,988 B2 | * | 4/2003 | Masaki et al. | 318/721 |
| 6,690,137 B2 | * | 2/2004 | Iwaji et al. | 318/700 |
| 6,756,753 B1 | * | 6/2004 | Marcinkiewicz | 318/400.04 |
| 6,838,843 B2 | * | 1/2005 | Imai et al. | 318/400.02 |
| 7,045,988 B2 | * | 5/2006 | Ha et al. | 318/807 |
| 2002/0113569 A1 | * | 8/2002 | Iijima et al. | 318/727 |

FOREIGN PATENT DOCUMENTS

| | | |
|---|---|---|
| JP | 2001-95281 | 4/2001 |
| JP | 2005-210813 | 8/2005 |
| JP | 2006-87152 | 3/2006 |
| JP | 2007-53829 | 3/2007 |

\* cited by examiner

*Primary Examiner* — Rita Leykin

(74) *Attorney, Agent, or Firm* — McGinn IP Law, PLLC

(57) ABSTRACT

A sensorless controlling apparatus for controlling a brushless motor includes a speed calculator for calculating speed of a rotor $\omega$, an angle calculator for calculating rotor angle $\theta$ at a predetermined time interval, and an angle controller for calculating correction angle $\Delta\theta$ based on the current value of a d-axis current (d-axis current value $i_d$), thereby controlling the rotor angle $\theta$. The angle calculator uses the correction angle $\Delta\theta$ calculated by the angle controller, the speed $\omega$ calculated by the speed calculator, a predetermined time, and the rotor angle $\theta$ calculated by the angle calculator at a predetermined time to calculate the rotor angle at the predetermined time interval. Thus, the rotor angle $\theta$ calculated by the angle calculator is converged on the true angle of the rotor.

3 Claims, 3 Drawing Sheets

SENSORLESS CONTROLLING APPARATUS OF BRUSHLESS MOTOR

BACKGROUND OF THE INVENTION

This invention relates to a sensorless controlling apparatus of a brushless motor for performing vector control by calculating the angle of a rotor using a d-axis current.

Generally, a controlling apparatus for performing vector control to control drive of a brushless motor is known. In the vector control, current values of three phases in a fixed coordinate system (namely, a coordinate system made up of a u axis, a v axis, and a w axis each forming an angle of 120 degrees and crossing at one point) are converted into currents of two phases (namely, d-axis current and q-axis current) in a rotating coordinate system (namely, a coordinate system made up of a d-axis indicating the magnetic flux direction of a field pole and a q-axis orthogonal to the d-axis) and the currents of two phases are used for controlling.

A sensorless controlling apparatus for performing the vector control and estimating the angle (position, phase) of a rotor without using a sensor for directly detecting the angle of a rotor of a brushless motor is known. As the sensorless controlling apparatus of a brushless motor, a controlling apparatus for estimating the angle of a rotor using the current values of a d-axis current and a q-axis current is disclosed. (For example, refer to Japanese Patent Laid-Open No. 2001-95281, Japanese Patent Laid-Open No. 2005-210813, Japanese Patent Laid-Open No. 2006-87152 and Japanese Patent Laid-Open No. 2007-53829)

However, in the related art described above, a motor model needs to be used to estimate the angle of the rotor of a brushless motor and the computation load is large. That is, since the angle of the rotor is estimated using inductance and resistance of a stator coil forming a part of the brushless motor, the computation load when loop processing is performed for frequently estimating the angle is large. Consequently, a high-cost CPU having a high-performance computation processing capability needs to be used; this is a problem.

Since the motor model of inductance, resistance, etc., of a coil forming a part of a brushless motor varies from one brushless motor to another, it is necessary to change a computation processing program to estimate the angle depending on the brushless motor to be controlled; this is a problem.

SUMMARY OF THE INVENTION

It is therefore an object of the invention to provide a sensorless controlling apparatus of a brushless motor for making it possible to use a low-cost CPU and eliminate the need for changing a computation processing program.

According to a first aspect of the invention, there is provided a sensorless controlling apparatus for controlling a brushless motor having a rotor having a permanent magnet and a stator having stator coils of a plurality of phases for generating a rotating magnetic field to rotate the rotor based on a vector control by calculating an angle of the rotor using a d-axis current, the sensorless controlling apparatus comprising:

a speed calculator that calculates speed of the rotor;
an angle controller that calculates a correction angle based on a current value of the d-axis current; and
an angle calculator that calculates an angle of the rotor at a predetermined time interval by using the correction angle calculated by the angle controller, the rotor speed calculated by the speed calculator, the predetermined time interval, and the rotor angle which has been calculated by the angle calculator at a predetermined time.

According to the configuration, the sensorless controlling apparatus includes the speed calculator for calculating the rotor speed, the angle calculator for calculating the rotor angle at a predetermined time interval, and the angle controller for calculating the correction angle based on the current value of the d-axis current, thereby controlling the rotor angle. The angle calculator calculates the rotor angle at the predetermined time interval by using the correction angle calculated by the angle controller, the rotor speed calculated by the speed calculator, the predetermined time interval, and the rotor angle calculated by the angle calculator at a predetermined time. Consequently, the rotor angle calculated by the angle calculator can be converged on the true angle of the rotor and sensorless vector control can be performed by performing simple computation with small computation load without using a motor model. The computation load decreases and the need for using a high-performance and high-cost CPU is eliminated. Therefore, a low-cost CPU can be used. Further, the rotor angle can be converged on the true angle of the rotor without using a motor model, so that it is not necessary to change the computation processing program corresponding to the brushless motor to be controlled. Therefore, the controlling apparatus high in general versatility can be provided.

A second aspect of the invention is characterized by the fact that in the sensorless controlling apparatus of the first aspect, the angle controller calculates the correction angle ($\Delta\theta$) based on the current value of the d-axis current by computing the following expression:

$$\Delta\theta = C_P \times E + C_I \times F$$

where E represents deviation between the current value of the d-axis current and a predetermined command value, $C_P$ represents a first constant, F represents an accumulated value of the deviation, and $C_I$ represents a second constant.

According to the configuration, the angle controller calculates the correction angle by using the current value of the d-axis current, the predetermined command value, the first constant, and the second constant, and computes the expression, thereby calculating the correction angle ($\Delta\theta$) based on the current value of the d-axis current, thereby controlling the rotor angle. Thus, the correction angle can be calculated by performing simple computation with small computation load to control the rotor angle (namely, the rotor angle calculated by the angle calculator).

A third aspect of the invention is characterized by the fact that in the sensorless controlling apparatus of the brushless motor of the first or second aspect, the angle calculator calculates the rotor angle ($\theta_{k+1}$) at a predetermined time interval by computing the following expression:

$$\theta_{k+1} = \theta_k + \omega \times T_s + \Delta\theta$$

where $\Delta\theta$ represents the correction angle calculated by the angle controller, $\omega$ represents the rotor speed calculated by the speed calculator, $T_s$ represents the predetermined time, and $\theta_k$ represents the rotor angle which has been calculated by the angle calculator at the predetermined time.

According to the configuration, the angle calculator calculates the rotor angle $\theta_{k+1}$ at the predetermined time interval by computing the expression. Thus, the rotor angle can be calculated by performing simple computation with small computation load.

A fourth aspect of the invention is characterized by the fact that in the sensorless controlling apparatus of the brushless motor of any one of the first to third aspects, if said speed calculator determines that the rotor rotates a predetermined angle based on the rotor angle calculated by the angle calculator, the speed calculator calculates the rotor speed (ω) by computing the following expression:

$$\omega = \delta/(K \times T_s)$$

where K represents the number of times the angle calculator has calculated the rotor angle while the rotor rotated the predetermined angle, $T_s$ represents the predetermined time, and δ represents the predetermined angle.

According to the configuration, if the speed calculator determines that the rotor has rotated the predetermined angle based on the rotor angle calculated by the angle calculator, the speed calculator calculates the rotor speed and also calculates the rotor speed ω by computing the expression. Thus, the rotor speed can be calculated based on the rotor angle calculated by the angle calculator and can be calculated by performing simple computation with small computation load.

According to the invention, there can be provided a sensorless controlling apparatus for a brushless motor for making it possible to use a low-cost CPU and further eliminate the need for changing a computation processing program corresponding to the brushless motor to be controlled.

DETAILED DESCRIPTION OF PREFERRED EMBODIMENTS

Figure 1:
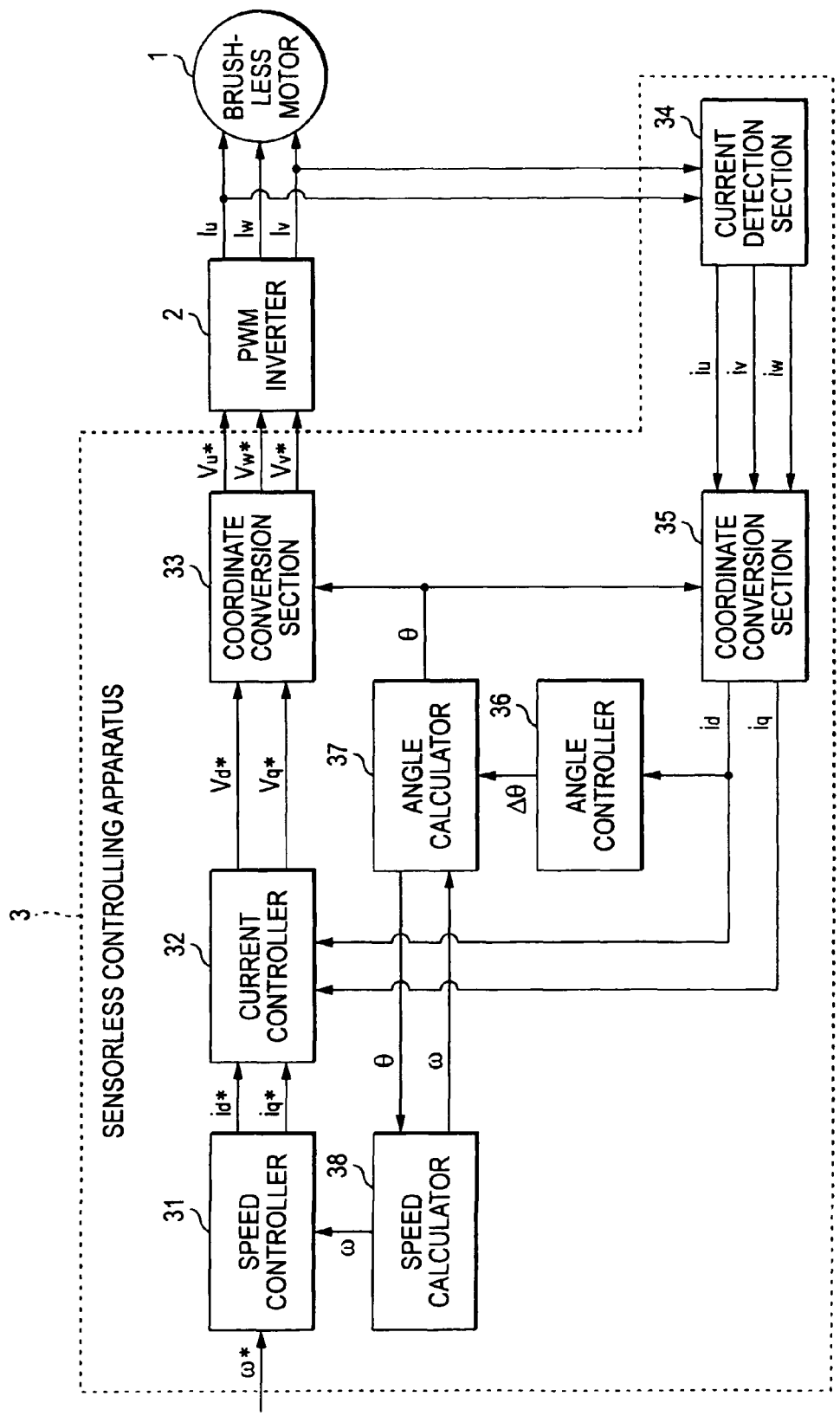
FIG. 1 is a block diagram to show the general configuration of a motor drive control system according to an embodiment of the invention.

Referring now to the accompanying drawings, there is shown a specific embodiment of the invention. The speed in Specification is the angular speed indicating the rotating speed.

A motor drive control system according to the embodiment of the invention includes a brushless motor 1 (simply, "motor 1"), a PWM inverter 2 for driving the motor 1, and a sensorless controlling apparatus 3 (simply, "controlling apparatus 3") for controlling the motor 1 by controlling the PWM inverter 2.

The motor 1 is made up of a rotor (not shown) having a permanent magnet and a stator (not shown) having stator coils (not shown) of a plurality of phases of a U phase, a V phase, and a W phase (namely, three phases) for generating a rotating magnetic field to rotate the rotor.

The PWM inverter 2 converts DC power supplied from a power supply section (not shown) of a battery, etc., into 3-phase AC power and commutates energization of the stator coils of three phases of the motor 1 in order, thereby supplying current to the U phase, the V phase, and the W phase. The currents supplied to the U phase, the V phase, and the W phase are called U phase current $I_u$, V phase current $I_v$, and W phase current $I_w$ respectively. Therefore, the PWM inverter 2 drives the motor 1 by supplying the U phase current $I_u$, the V phase current $I_v$, and the W phase current $I_w$ to the motor 1 so that the voltages corresponding to voltage command values are applied to the stator coils of three phases.

The controlling apparatus 3 includes a speed controller 31 for calculating d-axis·q-axis current command value $i_d^*$, $i_q^*$, a current controller 32 for calculating d-axis·q-axis voltage command value $v_d^*$, $v_q^*$ based on the d-axis·q-axis current command value $i_d^*$, $i_q^*$, and a coordinate conversion section 33 for calculating three-phase voltage command values $v_u^*$, $v_v^*$, and $v_w^*$ based on the d-axis·q-axis voltage command value $v_d^*$, $v_q^*$. The controlling apparatus 3 further includes a current detection section 34 for detecting phase current $I_u$, $I_v$, a coordinate conversion section 35 for calculating the current value of d-axis·q-axis current $I_d^*$, $I_q^*$ an angle controller 36 for calculating correction angle Δθ, an angle calculator 37 for calculating angle θ, and a speed calculator 38 for calculating speed ω for vector control. The described controlling apparatus 3 performs sensorless vector control for the motor 1 by calculating the angle θ of the rotor using the d-axis current Id. The sections 31 to 38 operate by a CPU (not shown) for executing a computation processing program and a control processing program stored in ROM (not shown) using RAM (not shown) having a work storage area.

The speed controller 31 subtracts the speed ω calculated by the speed calculator 38 from externally input command speed ω*, calculates d-axis current command value $i_d^*$ and q-axis current command value $i_q^*$ based on the subtraction result (ω*−ω), and outputs the axis current command values to the current controller 32. Generally, the d-axis current command value $i_d^*$ is 0.

The current controller 32 subtracts the current value of the d-axis current $I_d$ calculated by the coordinate conversion section 35 (which will be hereinafter referred to as "d-axis current value $i_d$") from the d-axis current command value $i_d^*$, calculates d-axis voltage command value $v_d^*$ based on the subtraction result ($i_d^*-i_d$), and outputs the d-axis voltage command value to the coordinate conversion section 33. Further, the current controller 32 subtracts the current value of the q-axis current $I_q$ calculated by the coordinate conversion section 35 (which will be hereinafter referred to as "q-axis current value $i_q$") from the q-axis current command value $i_q^*$, calculates q-axis voltage command value $v_q^*$ based on the subtraction result ($i_q^*-i_q$), and outputs the q-axis voltage command value to the coordinate conversion section 33.

The coordinate conversion section 33 uses the angle θ calculated by the angle calculator 37 to perform coordinate conversion of the d-axis voltage command value $v_d^*$ and the q-axis voltage command value $v_q^*$ into three-phase voltage command values $v_u^*$, $v_v^*$, and $v_w^*$. The coordinate conversion section 33 outputs the voltage command values $v_u^*$, $v_v^*$, and $v_w^*$ calculated by executing the coordinate conversion to the PWM inverter 2. Therefore, the PWM inverter 2 drives the motor 1 by supplying the U phase current $I_u$, the V phase current $I_v$, and the W phase current $I_w$ to the motor 1 so that the voltages corresponding to the voltage command values $v_u^*$, $v_v^*$, and $v_w^*$ are applied to the stator coils of three phases.

The current detection section 34 samples the current supplied to the motor 1 by the PWM inverter 2 at the interval of sampling time $T_s$, thereby detecting the U phase current $I_u$ and the V phase current $I_v$, and detecting current values $i_u$ and $i_v$. Further, the current detection section 34 calculates current value $i_w$ of the W phase current $I_w$ based on the current values $i_u$ and $i_v$ of the phase currents $I_u$ and $I_v$ (namely, indirectly detects the current value). The current detection section 34 outputs the current values $i_u$, $i_v$, and $i_w$ of the phase currents $I_u$, $I_v$, and $I_w$ of the three phases (U phase, V phase, and W phase) to the coordinate conversion section 35. In the embodiment, the W phase current value $i_w$ is calculated based on the current values $i_u$ and $i_v$. However, the current values of the phase currents $I_v$ and $I_w$ or the phase currents $I_u$ and $I_w$ may be detected and the current value $i_u$ or $i_v$ of the U phase current $I_u$ or the V phase current $I_v$ may be calculated based on the current values of the phase currents or all phase currents $I_u$, $I_v$, and $I_w$ may be directly detected and the current values $i_u$, $i_v$, and $i_w$ of the phase currents $I_u$, $I_v$, and $I_w$ may be detected. The sampling time Ts is shorter than the time for the rotor to make one revolution (namely, 360-degree rotation).

The coordinate conversion section 35 uses the angle θ calculated by the angle calculator 37 to perform coordinate conversion of the phase current values $i_u$, $i_v$, and $i_w$, thereby calculating the current values $i_d$ and $i_q$ of the d-axis current $I_d$ and the q-axis current $I_q$. The coordinate conversion section 35 outputs the d-axis current value $i_d$ to the angle controller 36 and the current controller 32 and outputs the q-axis current value $i_q$ to the current controller 32.

The angle controller 36 calculates the correction angle Δθ based on the d-axis current value $i_d$, thereby controlling the angle of the rotor. More specifically, whenever the d-axis current value $i_d$ is input to the angle controller 36 by the coordinate conversion section 35, the angle controller 36 calculates the correction angle Δθ repeatedly (more than once) For example, the correction angle Δθ is calculated by computing the following calculation expression:

$$\Delta\theta = C_P \times E + C_I \times F \quad \text{Expression 1}$$

In this expression, E is deviation between the d-axis current value $i_d$ and predetermined command value d*, and $C_P$ is a constant called proportional gain in PI (proportional plus integral) control. As the predetermined command value d*, 0 can be used. In the expression, F is an accumulated value of E of deviation between the d-axis current value $i_d$ and the predetermined command value d*, and $C_I$ is a constant called integral gain in PI control. That is, the angle controller 36 performs the PI control and optimum values are defined for the constants $C_P$ and $C_I$ according to the actual control result of the motor 1 by the controlling apparatus 3. Thus, there can be provided the controlling apparatus 3 high in general versatility capable of controlling the motor 1 independently of the inductance or resistance of the stator coils making up the controlled motor 1. In the embodiment, the angle controller 36 calculates the correction angle Δθ by performing the PI control using the constants $C_P$ and $C_I$, but may calculate the correction angle Δθ by performing PID control or may calculate the correction angle Δθ by performing P control without using $C_I$. To perform the P control, the correction angle Δθ is calculated by computing $\Delta\theta = C_P \times E$. The angle controller 36 outputs the calculated correction angle Δθ to the angle calculator 37. That is, the angle calculator 37 calculates the angle based on the correction angle Δθ calculated by the angle controller 36 and thus the angle controller 36 controls the angle θ of the rotor calculated by the angle calculator 37.

The angle calculator 37 calculates the angle θ of the rotor at the interval of the sampling time $T_s$. More specifically, the angle calculator 37 calculates the rotor angle $\theta_{k+1}$ by using the correction angle Δθ calculated by the angle controller 36, the speed ω calculated by the speed calculator 38, the sampling time $T_s$, and the angle $\theta_k$ calculated by the angle calculator 37 at a predetermined time. For example, the angle $\theta_{k+1}$ is calculated by computing the following calculation expression:

$$\theta_{k+1} = \theta_k + \omega \times T_s + \Delta\theta \quad \text{Expression 2}$$

As the rotor rotates, the angle θ monotonously increases. If the calculated angle $\theta_{k+1}$ is 2Π or more, 2Π is subtracted from the angle $\theta_{k+1}$, whereby the angle $\theta_{k+1}$ is deformed so as to satisfy the relation of $0 \leq \theta_{k+1} < 2\Pi$. The angle calculator 37 outputs the angle $\theta_{k+1}$ thus calculated to the speed calculator 38 and outputs it to the coordinate conversion sections 33 and 35 as the angle θ. Therefore, the angle calculator 37 calculates and outputs the angle θ each time phase current is sampled (namely, at the interval of the sampling time $T_s$).

The speed calculator 38 determines whether or not the rotor has rotated a predetermined angle δ based on the rotor angle θ calculated by the angle calculator 37. If the speed calculator 38 determines that the rotor has rotated the predetermined angle, the speed calculator 38 calculates the rotor speed ω. For example, the speed ω is calculated by computing the following calculation expression using the predetermined angle δ of rotation of the rotor and the product of the number of times the angle calculator 37 has calculated the rotor angle θ while the rotor rotated the predetermined angle, K, and the sampling time $T_s$ (namely, $K \times T_s$):

$$\omega = \delta/(K \times T_s) \quad \text{Expression 3}$$

More specifically, to determine whether or not the rotor has rotated 360 degrees, for example, and calculate the rotor speed ω, the speed calculator 38 makes a comparison between the angle $\theta_{k+1}$ calculated by the angle calculator 37 and the angle $\theta_k$ calculated just before calculation of the angle $\theta_{k+1}$, thereby determining whether or not the rotor has rotated 360 degrees. That is, if angle $\theta_{k+1} < \theta_k$, the angle $\theta_{k+1}$ calculated by the angle calculator 37 is 360 degrees or more and therefore it can be determined that the rotor has rotated 360 degrees (namely, one revolution). The speed calculator 38 counts the number of times a comparison has been made between $\theta_k$ and $\theta_{k+1}$ while the rotor rotated 360 degrees, thereby finding the number of times the angle controller 37 has calculated the rotor angle θ while the rotor rotated 360 degrees, K, (namely, the number of sampling times a phase current has been sampled). Therefore, to determine whether or not the rotor has rotated 360 degrees and calculate the rotor speed ω, the product of the number of times K and the sampling time $T_s$ ($K \times T_s$) represents the time required for the rotor to rotate 360 degrees (namely, 2Π) and the rotor speed ω is calculated by computing $\omega = 2\Pi/(K \times T_s)$ where 2Π is assigned to δ in expression (3).

The speed calculator 38 the speed ω thus calculated to the angle calculator 37 and the speed controller 31. That is, the rotor speed ω is updated each time the rotor rotates the predetermined angle (for example, 360 degrees).

<Calculation Procedures of Angle and Speed of Rotor>

Figure 2:
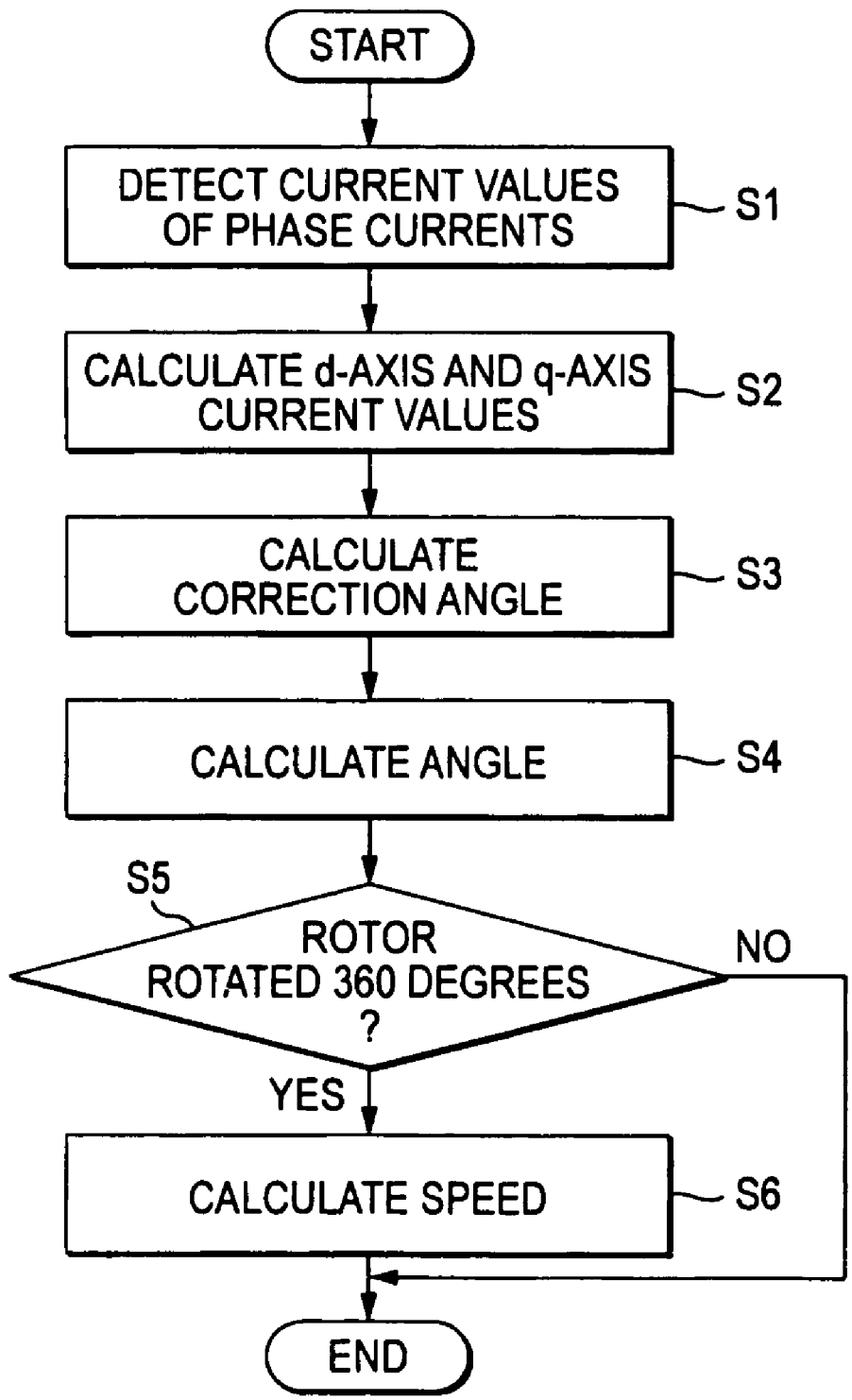
FIG. 2 is a flowchart to show a calculation procedure of the angle and the speed of a rotor.

The controlling apparatus 3 of the motor 1 of the embodiment is characterized by the fact that it calculates the rotor angle θ without using a motor model by executing the computation processing program and the control processing program. FIG. 2 is a flowchart to show the operation of the controlling apparatus 3 to calculate the angle θ and the speed ω. The control processing program is a program for executing the operation shown in the flowchart of FIG. 2 in the period of the sampling time $T_s$. A calculation procedure of rotor angle $\theta_{n+1}$ calculated at time n (namely, rotor angle at time $n+T_s$ after the sampling time $T_s$ from the time n) and a calculation procedure of the speed ω every 360-rotation of the rotor will be discussed in detail with reference to FIG. 2.

To begin with, the current detection section 34 detects the current values of the U phase current $I_u$ and the V phase current $I_v$ at the time n and calculates the current value of the W phase current $I_w$ at the time n (step S1). Next, using the angle θ (namely, angle $\theta_n$ calculated by the angle calculator 37 at time $n-T_s$ (sampling time of phase current just before the time n)), the coordinate conversion section 35 executes coordinate conversion of the current values of the phase currents $I_u$, $I_v$, and $I_w$ and calculates the d-axis current value $i_d$ and the q-axis current value $i_q$ (step S2).

Figure 3:
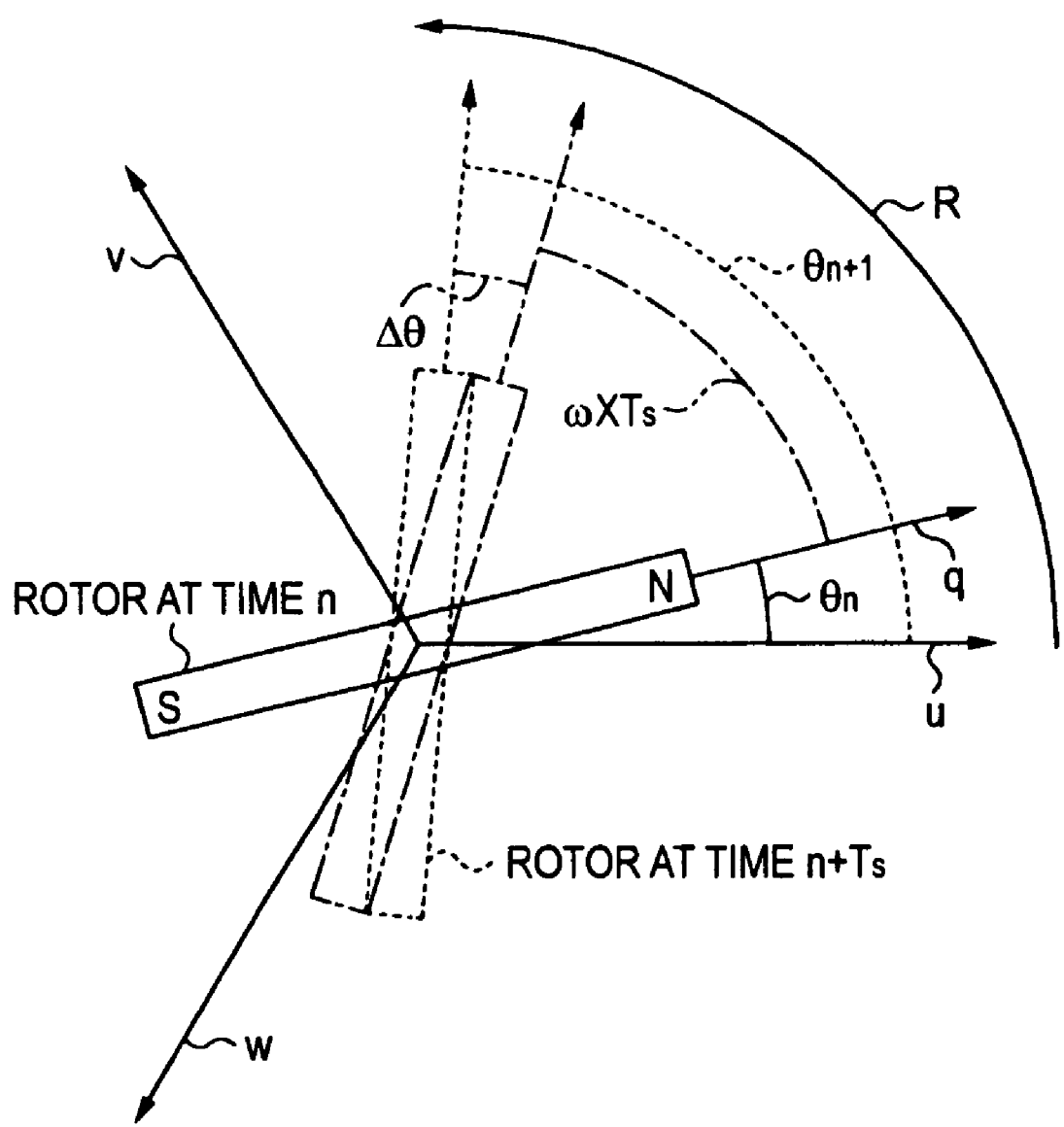
FIG. 3 is a drawing to describe the angle calculated by an angle calculator.

Next, the angle controller 36 uses the d-axis current value $i_d$ calculated at step S2 to calculate the correction angle Δθ (step S3). The angle calculator 37 calculates the rotor angle $\theta_{n+1}$ at the time $n+T_s$ (step S4). More specifically, the angle calculator 37 calculates the angle $\theta_{n+1}$ by computing $\theta_{n+1}=\theta_n+\omega\times T_s+\Delta\theta$ wherein n is assigned to k in expression (2). That is, as shown in FIG. 3, when the rotor rotates in the direction of arrow R in the figure, the sum of the rotor angle θn at the time n, the rotor rotation angle from the time n to the time n+$T_s$ ($\omega\times T_s$), and the correction angle Δθ is the rotor angle $\theta_{n+1}$ at the time n+$T_s$. Therefore, the rotor angle $\theta_{k+1}$ is calculated using not only the rotor angle θn at the time n and the rotor rotation angle from the time n to the time n+$T_s$ ($\omega\times T_s$), but also the correction angle Δθ. Thus, the angle controller 36 can control the rotor angle θ calculated by the angle calculator 37 so as to converge (bring) the rotor angle θ calculated at the interval of the sampling time $T_s$ by the angle calculator 37 on (close to) the true angle of the rotor (namely, the actual angle).

The speed calculator 38 determines whether or not the rotor has rotated 360 degrees (namely, one revolution) (step S5). If it is determined at step S5 that the rotor has rotated 360 degrees (namely, 2Π), the speed calculator 38 calculates the rotor speed ω and updates the speed (step S6). The speed ω is calculated by computing ω=2Π/(K×$T_s$) wherein 2π is assigned to δ in expression (3). On the other hand, if it is not determined at step S5 that the rotor has rotated 360 degrees, the rotor speed ω is not updated. In the embodiment, if it is determined that the rotor has rotated 360 degrees, the speed calculator 38 calculates the rotor speed ω, but the rotation angle may be any angle other than 360 degrees.

According to the controlling apparatus 3 of the embodiment described above, the following advantages can be provided:

(1) The controlling apparatus 3 includes the speed calculator 38 for calculating the rotor speed ω, the angle calculator 37 for calculating the rotor angle θ at the interval of the predetermined sampling time $T_s$, and the angle controller 36 for calculating the correction angle Δθ based on the current value of the d-axis current $I_d$ (namely, the d-axis current value $i_d$), thereby controlling the rotor angle θ. The angle calculator 37 uses the correction angle Δθ calculated by the angle controller 36, the speed ω calculated by the speed calculator 38, the sampling time $T_s$, and the angle $\theta_n$ calculated by the angle calculator 37 at the predetermined time n–$T_s$ to calculate the rotor angle $\theta_{n+1}$ at the interval of the sampling time $T_s$. Consequently, the rotor angle θ calculated by the angle calculator 37 can be converged on the true angle of the rotor and sensorless vector control can be performed by performing simple computation with small computation load without using a motor model. The computation load decreases and the need for using a high-performance and high-cost CPU is eliminated. Therefore, a low-cost CPU can be used. Further, the rotor angle θ can be converged on the true angle of the rotor without using a motor model, so that it is not necessary to change the computation processing program depending on the brushless motor to be controlled. Therefore, the controlling apparatus 3 high in general versatility can be provided. The angle calculator 37 does not use the voltage value to calculate the rotor angle $\theta_{n+1}$ and thus it is hard to receive the effect of voltage fluctuation in the power supply section of a battery, etc.

(2) The angle controller 36 calculates the correction angle Δθ by using the current value of the d-axis current $I_d$ (namely, the d-axis current value $i_d$), the predetermined command value d* (for example, 0), the constant (first constant) $C_P$, and the constant (second constant) $C_I$, and the angle controller 36 computes expression (1), thereby calculating the correction angle Δθ based on the current value of the d-axis current $I_d$, thereby controlling the rotor angle θ. Thus, the correction angle Δθ can be calculated by performing simple computation with small computation load to control the rotor angle θ (namely, the rotor angle calculated by the angle calculator 37).

(3) The angle calculator 37 calculates the rotor angle $\theta_{n+1}$ at the interval of the sampling time $T_s$ by computing expression (2). Thus, the rotor angle θ can be calculated by performing simple computation with small computation load.

(4) If the speed calculator 38 determines that the rotor has rotated the predetermined angle based on the rotor angle θ calculated by the angle calculator 37, the speed calculator 38 calculates the rotor speed ω and also calculates the rotor speed ω by computing expression (3). Thus, the rotor speed ω can be calculated based on the rotor angle θ calculated by the angle calculator 37 and can be calculated by performing simple computation with small computation load.

It is to be understood that the invention is not limited to the specific embodiment described above and various design changes can be made based on the spirit of the invention and are not excluded from the scope of the invention. For example, the embodiment described above may be changed as follows:

In the embodiment described above, if the speed calculator 38 determines that the rotor has rotated the predetermined angle, it calculates the rotor speed ω and also calculates the rotor speed ω by computing expression (3), but may calculate the rotor speed ω each time the angle calculator 37 calculates the rotor angle θ. In this case, the speed calculator 38 calculates the rotor speed ω by computing the following calculation expression:

$$\omega=(\theta_{k+1}-\theta_k)/T_s \qquad \text{Expression 4}$$

In so doing, the rotor speed ω is calculated each time the angle calculator 37 calculates the rotor angle θ, so that more accurate speed ω can be calculated.

What is claimed is:

1. A sensorless controlling apparatus for controlling a brushless motor including a rotor including a permanent magnet and a stator including stator coils of a plurality of phases for generating a rotating magnetic field to rotate the rotor based on a vector control by calculating an angle of the rotor using a d-axis current, the sensorless controlling apparatus comprising:

a speed calculator that calculates speed of the rotor;

an angle controller that calculates a correction angle based on a current value of the d-axis current; and an angle calculator that calculates an angle of the rotor at a predetermined time interval by using the correction angle calculated by the angle controller, the rotor speed calculated by the speed calculator, the predetermined time interval, and the rotor angle which has been calculated by the angle calculator at a predetermined time, wherein the angle controller calculates the correction angle (Δθ) based on the current value of the d-axis current by computing the following expression:

$$\Delta\theta=C_P\times E+C_I\times F$$

where E represents deviation between the current value of the d-axis current and a predetermined command value, $C_P$ represents a first constant, F represents an accumulated value of the deviation, and $C_I$ represents a second constant.

2. A sensorless controlling apparatus for controlling a brushless motor including a rotor including a permanent magnet and a stator including stator coils of a plurality of phases for generating a rotating magnetic field to rotate the rotor based on a vector control by calculating an angle of the rotor using a d-axis current, the sensorless controlling apparatus comprising:

a speed calculator that calculates speed of the rotor;

an angle controller that calculates a correction angle based on a current value of the d-axis current; and an angle calculator that calculates an angle of the rotor at a predetermined time interval by using the correction angle calculated by the angle controller, the rotor speed calculated by the speed calculator, the predetermined time interval, and the rotor angle which has been calculated by the angle calculator at a predetermined time, wherein the angle calculator calculates the rotor angle ($\theta_{k+1}$) at a predetermined time interval by computing the following expression:

$$\theta_{k+1} = \theta_k + \omega \times T_s + \Delta\theta$$

where $\Delta\theta$ represents the correction angle calculated by the angle controller, $\omega$ represents the rotor speed calculated by the speed calculator, $T_s$ represents the predetermined time, and $\theta_k$ represents the rotor angle which has been calculated by the angle calculator at the predetermined time.

3. A sensorless controlling apparatus for controlling a brushless motor including a rotor including a permanent magnet and a stator including stator coils of a plurality of phases for generating a rotating magnetic field to rotate the rotor based on a vector control by calculating an angle of the rotor using a d-axis current, the sensorless controlling apparatus comprising:

a speed calculator that calculates speed of the rotor;

an angle controller that calculates a correction angle based on a current value of the d-axis current; and an angle calculator that calculates an angle of the rotor at a redetermined time interval by using the correction angle calculated by the angle controller, the rotor speed calculated by the speed calculator, the predetermined time interval, and the rotor angle which has been calculated by the angle calculator at a predetermined time, wherein, if said speed calculator determines that the rotor rotates a predetermined angle based on the rotor angle calculated by the angle calculator, then the speed calculator calculates the rotor speed ($\omega$) by computing the following expression:

$$\omega = \delta / (K \times T_s)$$

where K represents the number of times the angle calculator has calculated the rotor angle while the rotor rotated the predetermined angle, $T_s$ represents the predetermined time, and $\delta$ represents the predetermined angle.

* * * * *